US010924258B2

(12) United States Patent
Yamakage

(10) Patent No.: US 10,924,258 B2
(45) Date of Patent: Feb. 16, 2021

(54) SYNCHRONIZATION CONTROL APPARATUS AND SYNCHRONIZATION CONTROL METHOD

(71) Applicants: KABUSHIKI KAISHA TOSHIBA, Minato-ku (JP); Toshiba Infrastructure Systems & Solutions Corporation, Kawasaki (JP)

(72) Inventor: Tomoo Yamakage, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 16/382,781

(22) Filed: Apr. 12, 2019

(65) Prior Publication Data
US 2019/0319776 A1 Oct. 17, 2019

(30) Foreign Application Priority Data
Apr. 13, 2018 (JP) .................. 2018-077398

(51) Int. Cl.
H04L 7/00 (2006.01)
G06F 1/08 (2006.01)
G06F 1/12 (2006.01)
H04J 3/06 (2006.01)

(52) U.S. Cl.
CPC ............. *H04L 7/0054* (2013.01); *G06F 1/08* (2013.01); *G06F 1/12* (2013.01); *H04J 3/0667* (2013.01)

(58) Field of Classification Search
CPC .............................. H04L 7/0054; H04J 3/0667
See application file for complete search history.

(56) References Cited

U.S. PATENT DOCUMENTS

2018/0124451 A1 5/2018 Takahashi et al.

FOREIGN PATENT DOCUMENTS

| EP | 3 163 787 A1 | 5/2017 |
| JP | 2001-257654 | 9/2001 |
| WO | WO 2017/026248 A1 | 2/2017 |

OTHER PUBLICATIONS

SMPTE Standard: "Generation and Alignment of Interface Signals to the SMPTE Epoch", SMPTE ST 2059-1:2015, pp. 1-31.
A. Sato, et al., "Development of MPEG-2 TS Multiplex Equipment", NEC Technical Journal, vol. 57, No. 4, 2004. 10 pages with Machine Generated English Translation.
"Request for Standardization", Joint EBU / SMPTE Task Force on Timing and Synchronization, EBU.UER, XP008113642, Aug. 20, 2009, 127 pages.

*Primary Examiner* — Angel T Brockman
(74) *Attorney, Agent, or Firm* — Oblon, McClelland, Maier & Neustadt, L.L.P.

(57) ABSTRACT

According to one embodiment, there is provided a synchronization control apparatus which synchronizes an STC counter value, based on TAI (Temps Atomique International: international atomic time) time, in each of systems which constitute a transmission system in a broadcasting system or a distribution system, the apparatus includes a processor or a dedicated arithmetic circuit configured to determine a time length in which the STC counter value laps, to calculate a remainder of the time length relative to the TAI time, and to convert the remainder to the STC counter value, thereby determining the STC counter value.

8 Claims, 8 Drawing Sheets

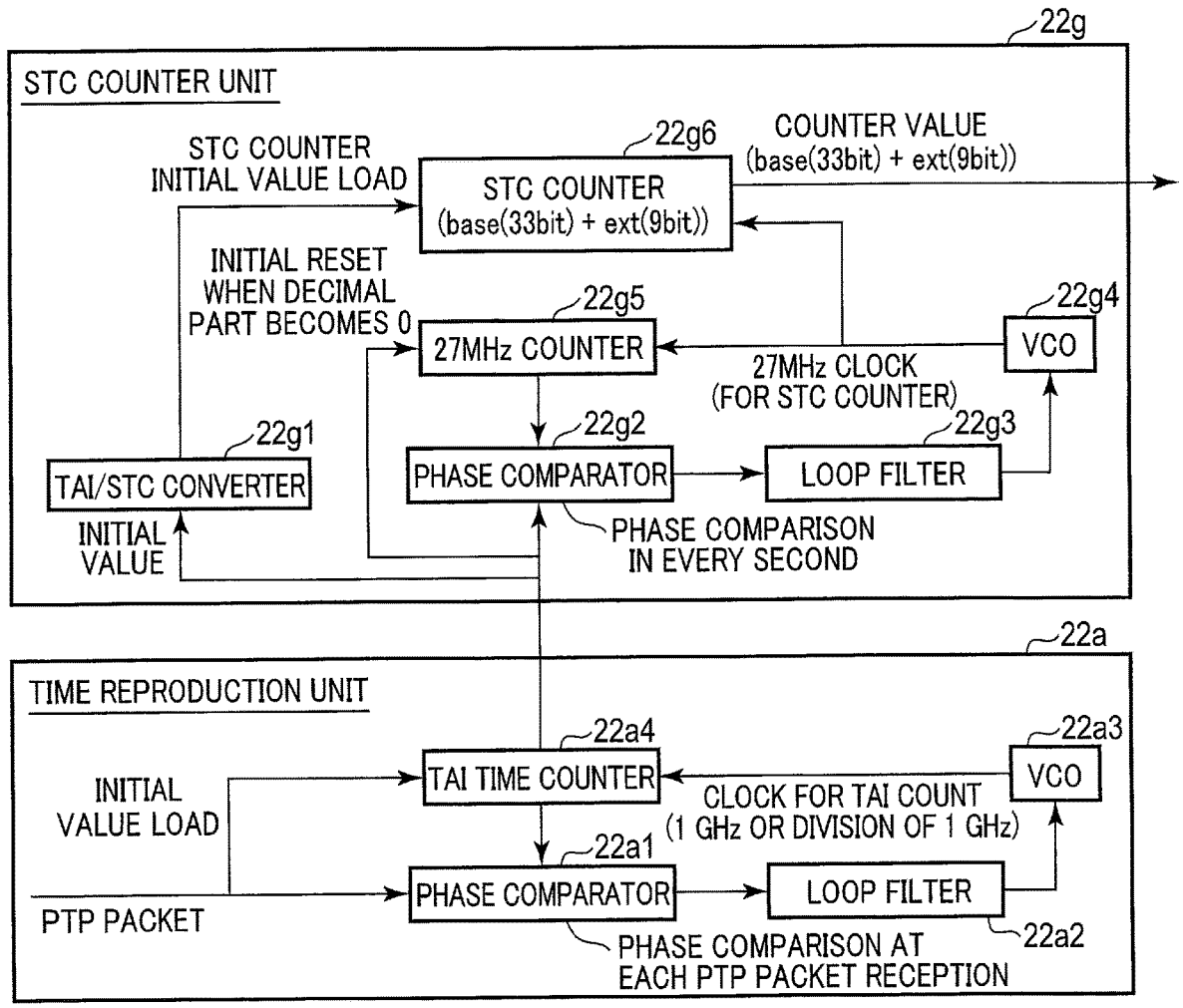
F I G. 7

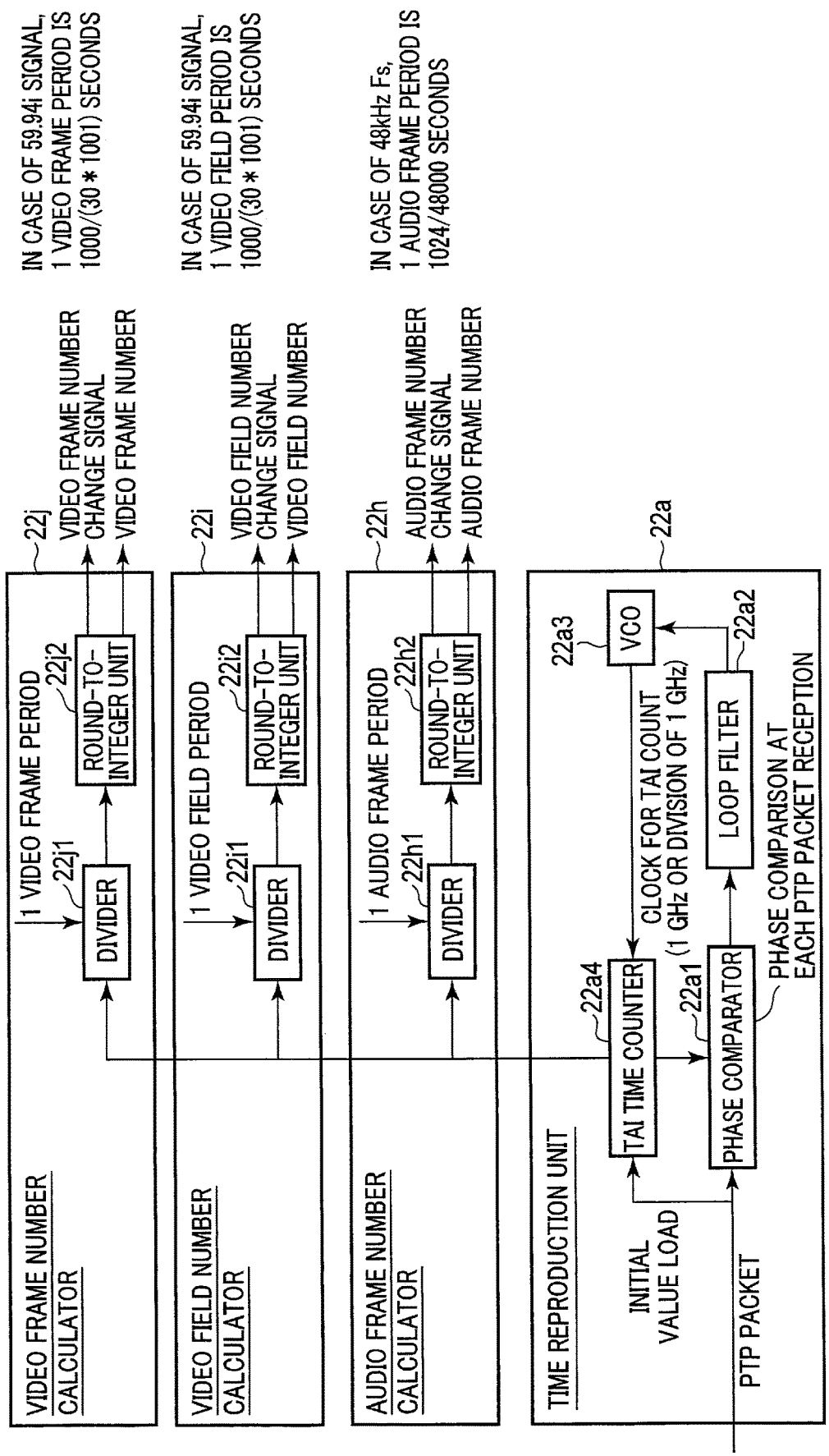
F I G. 8

SYNCHRONIZATION CONTROL APPARATUS AND SYNCHRONIZATION CONTROL METHOD

CROSS-REFERENCE TO RELATED APPLICATIONS

This application is based upon and claims the benefit of priority from Japanese Patent Application No. 2018-077398, filed Apr. 13, 2018, the entire contents of which are incorporated herein by reference.

FIELD

Embodiments of the present invention relate to an apparatus and method for inter-system synchronization control in a broadcasting system or a distribution system, such as a terrestrial digital broadcasting system, a satellite broadcasting system or an IP retransmission system.

BACKGROUND

At present, in a broadcast system or a distribution system, such as a terrestrial digital broadcasting system, a satellite broadcasting system or an IP retransmission system, a redundant system is constructed on the assumption of an apparatus fault or apparatus maintenance.

In this kind of redundant system, in order to implement seamless system switching between systems, it is imperative to synchronize STC (System Time Clock) counter values of TS (Transport Stream) (T-STD model) between the systems.

In order to synchronize STC counter values, STC counter values are first sampled, and are input as PCR (Program Clock Reference) to each apparatus (e.g. MPEG encoder, TS multiplexing apparatus) in PCR packet format. Thereby, the STC counter values in the respective apparatuses are synchronized.

The PCR packet signal is distributed to each apparatus by a DVB-ASI interface (coaxial cable). Aside from this, video/audio/auxiliary signals are transmitted between apparatuses by an SDI interface (coaxial cable).

In recent years, the standardization of a video/audio transmission method using IP packets (Ethernet (trademark)), which is called "Media over IP" (hereinafter abbreviated as "MoIP"), has been in progress. In connection with this, in the SMPTE, in addition to the transmission of video/audio/auxiliary information (SMPTE ST 2022, 2110), the generation of synchronization signals using PTP that is time information has also been standardized (SMPTE ST 2059).

In order to construct the redundant system by using TS, clock synchronization of STC counter values between systems is necessary, as described above. International Patent Application WO2017/026248 discloses a method of synchronizing clocks for operating STC counters, from time information reproduced from PTP (Picture Transfer Protocol).

However, in the conventional method disclosed in International Patent Application WO2017/026248, the clocks for operating STC counters are synchronized, and STC counter values necessary for redundancy switching of TS cannot be synchronized. Thus, in the conventional terrestrial digital broadcasting system, the redundancy switching of TS cannot be performed unless video/audio is transmitted by the IP (MoIP) and STC counter values are transmitted by the coaxial cable.

Accordingly, in the broadcasting system (including CATV, etc.) and distribution system in which the redundant system is constituted by using TS, there is the problem that it is not possible to construct all interfaces by IP-based implementation (i.e. to construct all interfaces by using IP packets), and there remains signal distribution by the coaxial cable.

The object of the present invention is to provide a synchronization control apparatus and synchronization control method which can synchronize STC counter values, thereby to realize seamless switching between systems in a broadcast system or distribution system in which interfaces are constructed by IP-based implementation.

BRIEF DESCRIPTION OF THE DRAWINGS

FIG. 7 is a functional block diagram illustrating detailed configuration examples of an STC counter unit and a time reproduction unit, by which the synchronization control method and synchronization control apparatus of the second embodiment are realized.

FIG. 8 is a block diagram illustrating configuration examples of an audio frame number calculator, a video field number calculator and a video frame number calculator provided in a rear stage of the time reproduction unit.

DETAILED DESCRIPTION

Hereinafter, a synchronization control method and synchronization control apparatus of each of embodiments of the present invention will be described with reference to the accompanying drawings.

A synchronization control apparatus of an embodiment synchronizes an STC counter value, based on TAI (Temps Atomique International: international atomic time) time, in each of systems which constitute a transmission system in a broadcasting system or a distribution system. The synchronization control apparatus includes a processor or a dedicated arithmetic circuit. The processor or the dedicated arithmetic circuit is configured to determine a time length in which the STC counter value laps, to calculate a remainder of the time length relative to the TAI time, and to convert the remainder to the STC counter value, thereby determining the STC counter value.

First Embodiment

A synchronization control method and synchronization control apparatus of a first embodiment will be described.
(Compression Multiplex System Control Apparatus)

Figure 1:
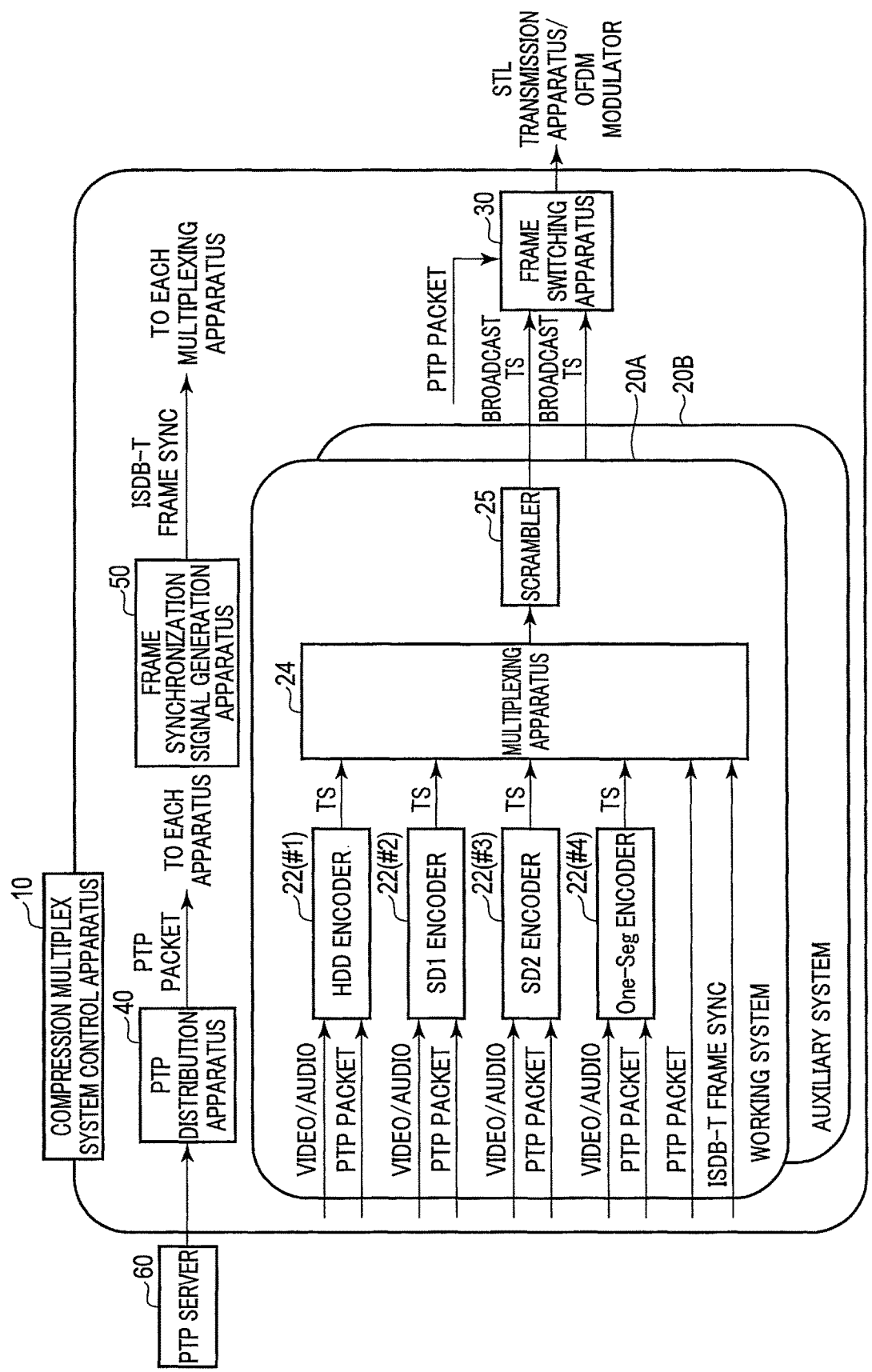
FIG. 1 is a configuration view illustrating an example of a compression multiplex system control apparatus to which a synchronization control method and synchronization control apparatus of a first embodiment are applied.

FIG. 1 is a configuration view illustrating an example of a compression multiplex system control apparatus to which the synchronization control method and synchronization control apparatus of the first embodiment are applied.

A compression multiplex system control apparatus 10 illustrated in FIG. 1 is an apparatus provided in a broadcasting system or distribution system, such as a terrestrial digital broadcasting system, a satellite broadcasting system or an IP retransmission system. The compression multiplex system control apparatus 10 compression-encodes video/audio and PTP packets, generates broadcast TS signals according to a terrestrial digital broadcast method, and outputs the broadcast TS signals to transmission equipment.

The compression multiplex system control apparatus 10 includes a working system 20A and an auxiliary system 20B, which have the same configuration, for the purpose of redundancy. Each of the working system 20A and auxiliary system 20B includes a plurality of encoders 22(#1) to 22(#4), a multiplexing apparatus 24, and a scrambler 25.

In order to execute seamless system switching between the working system 20A and auxiliary system 20B, it is necessary to synchronize STC counter values between the encoders 22(#1) to 22(#4) and multiplexing apparatuses 24 in both systems 20A and 20B. Thus, the synchronization control apparatus of the present embodiment is assembled in the encoders 22(#1) to 22(#4) and multiplexing apparatuses 24 in both systems 20A and 20B, and the synchronization control method of the embodiment is implemented in the encoders 22(#1) to 22(#4) and multiplexing apparatuses 24 in both systems 20A and 20B. The details of the synchronization control implemented in the encoders 22(#1) to 22(#4) and multiplexing apparatuses 24 will be described in the detailed description of the encoder 24 and multiplexing apparatus 24, which will be given later.

The compression multiplex system control apparatus 10 includes a frame switching apparatus 30 which is provided common to the working system 20A and auxiliary system 20B.

The compression multiplex system control apparatus 10 further includes a PTP distribution apparatus 40 which distributes PTP packets, which are delivered from a PTP server 60 provided outside the compression multiplex system control apparatus 10, to the encoders 22(#1) to 22(#4), multiplexing apparatuses 24 and frame switching apparatus 30.

Moreover, the compression multiplex system control apparatus 10 includes a frame synchronization signal generation apparatus 50 which generates ISDB-T (Integrated Services Digital Broadcasting-Terrestrial) frame synchronization signals, and outputs the generated ISDB-T frame synchronization signals to each multiplexing apparatus 24. Although ISDB-T is described here by way of example, the frame synchronization signal generation apparatus 50 is also applicable to other broadcasting methods using TS, such as ISDB-S, ATSC (Advanced Television Systems Committee standard) and DVB (Digital Video Broadcasting) methods.

Each of the encoder 22(#1) (HD encoder), encoder 22(#2) (SD1 encoder), encoder 22(#3) (SD2 encoder) and encoder 22(#4) (One-Seg encoder that uses only one segment of the bandwidth in the ISDB-T broadcast system) compression-encodes video/audio by using PTP packets distributed from the PTP distribution apparatus 40, and outputs the compression-encoded video/audio to the multiplexing apparatus 24.

The video signals and PTP packets may be input to each of the encoders 22(#1) to 22(#4) by one Ethernet cable. Alternatively, when the encoders 22(#1) to 22(#4) are integrated in one housing, the video signals and PTP packets may be input to all encoders 22(#1) to 22(#4) by one common Ethernet cable. Although FIG. 1 illustrates four encoders 22, the number of encoders 22 is not limited to four, and may be three or less, or five or more.

The multiplexing apparatus 24 multiplexes the video/audio, which is compression-encoded by each of the encoders 22(#1) to 22(#4), into a broadcast TS signal having an ISDB-T frame structure, by using the PTP packets output from the PTP distribution apparatus 40 and the ISDB-T frames output from the frame synchronization signal generation apparatus 50, and outputs the broadcast TS signal to the scrambler 25.

The scrambler 25 executes a scramble process on the broadcast TS signal output from the multiplexing apparatus 24, and outputs the scramble-processed broadcast TS signal to the frame switching apparatus 30.

The frame switching apparatus 30 performs frame phase adjustment on the broadcast TS signal output from the scrambler 25, by using the PTP packets distributed from the PTP distribution apparatus 40, and outputs the frame-phase-adjusted broadcast TS signal to transmission equipment such as an STL transmission apparatus, OFDM modulator, or the like.

Figure 2:
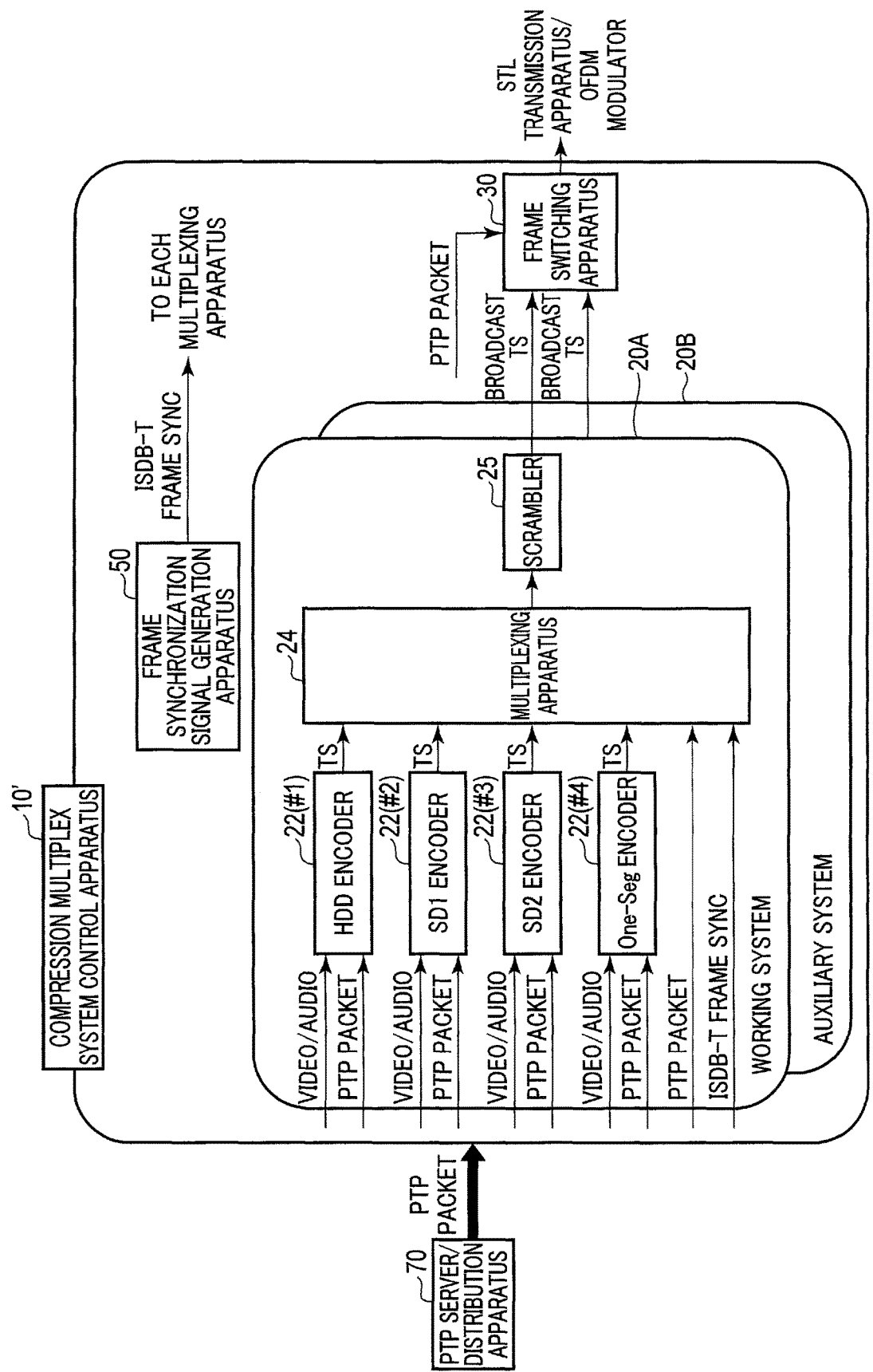
FIG. 2 is a configuration view illustrating another example of the compression multiplex system control apparatus to which the synchronization control method and synchronization control apparatus of the first embodiment are applied.

FIG. 2 is a configuration view illustrating another example of the compression multiplex system control apparatus to which the synchronization control method and synchronization control apparatus of the first embodiment are applied.

A compression multiplex system control apparatus 10' illustrated in FIG. 2 is a modification of the compression multiplex system control apparatus 10 illustrated in FIG. 1. The compression multiplex system control apparatus 10' does not include the PTP distribution apparatus 40, and includes, instead, a PTP server/distribution apparatus 70, in which the PTP server 60 and distribution apparatus 40 illustrated in FIG. 1 are integrated, on the outside of the compression multiplex system control apparatus 10'.

The PTP server/distribution apparatus 70 outputs PTP packets to the encoders 22(#1) to 22(#4), multiplexing apparatuses 24 and frame switching apparatus 30.

(Encoder)

Figure 3:
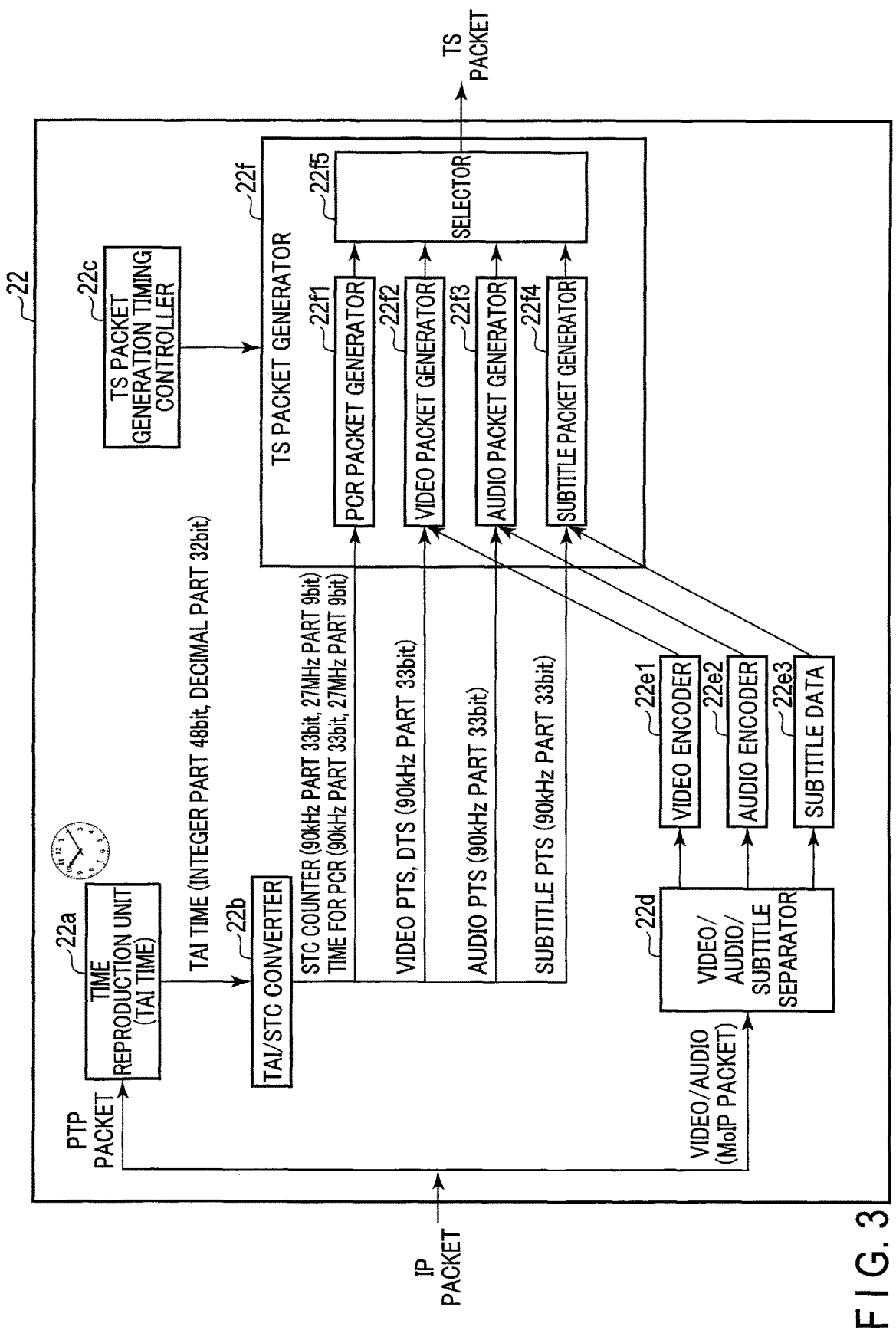
FIG. 3 is a conceptual view illustrating a configuration example of an encoder to which the synchronization control method and synchronization control apparatus of the first embodiment are applied.

FIG. 3 is a conceptual view illustrating a configuration example of the encoder 22 to which the synchronization control method and synchronization control apparatus of the first embodiment are applied.

The encoder 22 includes a processor (not shown) and a program memory (not shown). The encoder 22 includes, as necessary control functions for implementing the present embodiment, a time reproduction unit 22a, a TAI/STC converter 22b, a TS packet generation timing controller 22c, a video/audio/subtitle separator 22d (hereinafter, simply referred to as "separator 22d"), a video encoder 22e1, an audio encoder 22e2, and a TS packet generator 22f. These control functions are realized by causing the CPU to execute programs stored in the program memory.

The TS packet generator 22f further includes a PCR packet generator 22f1, a video packet generator 22f2, an audio packet generator 22f3, a subtitle packet generator 22f4, and a selector 22f5.

As described above, video/audio and PTP packets are input to the encoder 22. The video/audio and PTP packets are input in the form of IP packets. As an example, video/audio is a MoIP packet.

The time reproduction unit 22a receives the PTP packet included in the input IP packet, samples TAI time at the time of receiving the PTP packet, and outputs the sampled TAI time to the TAI/STC converter 22b. The TAI time is a time based on Jan. 1, 1970 as the reference time.

The TAI/STC converter 22b converts the TAI time, which is output from the time reproduction unit 22a, to STC counter values (PCR value, PTS value, DTS value). These STC counter values are used for synchronization control between the systems.

Accordingly, the TAI/STC converter 22b operates as a synchronization control apparatus by which the synchronization control method of the present embodiment is implemented in the corresponding encoders 22 of the working system 20A and auxiliary system 20B.

The TAI time is expressed, for example, by 80 bits in total, which include 48 bits of an integer second and 32 bits of a decimal second. A 64-bit CPU, which is now widely used, cannot simply perform arithmetic operations which treat 80 bits. In addition, in the TAI time, a decimal fraction (e.g. recurring decimal), which cannot exactly be expressed by a power of 2, is treated. Thus, unless a mapping method is made unique, an error occurs between difference apparatuses when the TAI time is converted to STC counter values. By rounding a decimal part of the TAI time by a predetermined rule (e.g. round-off to millisecond precision) before executing conversion, the TAI time can be treated in 64-bit operations. However, with the millisecond precision, it is not possible to obtain 27 MHz precision (1 clock=about 37 nanoseconds) which is required for STC counter values, and a problem occurs depending on systems to be applied. Thus, the present embodiment shows a method of converting the TAI time to STC counter values with higher precision. As exemplarily illustrated below, the TAI/STC converter 22b of each encoder, 22(#1) to 22(#4), repeats a process of narrowing the range of values which are treated in the range in which calculation by 64-bit operations is possible, so that an error occurs only in the last step.

Specifically, in this process, a time length (e.g. $2^{33}/90,000$ seconds), in which the STC counter value laps, is determined, and a remainder of the time length (e.g. $2^{33}/90,000$ seconds) relative to the TAI time is calculated. Specifically, in order to calculate the remainder, a remainder of an integer or a finite decimal, which is obtained by multiplying the time length (e.g. $2^{33}/90,000$ seconds), in which the STC counter value laps, by an integer, is calculated. It should be noted, however, that when the remainder is calculated by the finite decimal, the TAI time and the finite decimal are multiplied by $10^n$ (n is a natural number), so that the finite decimal becomes an integer.

Next, the calculated remainder is converted to the STC counter value (e.g. a PCR value composed of a base of 90 kHz and an extension of 27 kHz). Specifically, the STC counter value is determined as a PCR value composed of a base of a first frequency and an extension of a second frequency.

A concrete example of the above process is shown below.

Here, as regards the TAI time, an integer second is 48 bits (binary number), and a decimal second is 32 bits (0~999, 999,999*$10^{-9}$), and is substantially 30 bits.

Integer second (48 bits)
1234 5678 9ABC (hexadecimal notation)
20,015,998,343,868 (decimal notation)
Decimal second (32 bits, substantially 30 bits since the decimal second is in the range of 0~0.999 999 999 (decimal notation))
1234 5678 (hexadecimal notation)
0.305 419 896 (decimal notation).

A description is further given by taking, as an example, 20,015,998,343,868.305 419 896 in the decimal notation.

At this time point, the precision of 78 (=48+30) bits is necessary, and the precision is insufficient in 64-bit arithmetic operations.

Since $2^{33}$clock@90 kHz=95443.7176888888 . . . seconds are an infinite decimal, this is multiplied by 5625 and rounded to an integer. Thereby, the infinite decimal becomes 95,443.7176888888 . . . ×5,625=536,870,912 seconds. Specifically, in 536,870,912 seconds, $2^{33}$clock@90 kHz laps (circles) 5,625 times. Since counting starts once again from 0 after the lap, the necessary information is a remainder (modulo) after the lap.

Thereby, by finding the modulo of 536,870,912 seconds, a dynamic range of integer seconds is reduced.

20,015,998,343,868%536,870,912=377,002,684 seconds.

Thereby, the integer second part is reduced to a 29-bit width of 0~536,870,911 (0x1FFF FFFF), and the precision of 59 (=29+30) bits is obtained together with the decimal part. If the residual seconds and decimal seconds are added, 536,870,912.305 419 896 seconds are obtained (1).

At this stage, if the number of cycles at 27 MHz is calculated, 536,870,912.305 419 896/(1/27,000,000)=1.449 551 463 224 633e+16 is obtained. Specifically, the required precision of arithmetic operation is 64 bits.

In order to separate a 90 kHz part (base) and 27 MHz part (extension) of the STC counter value, a value (integer) obtained by division by 300 is calculated for the base, and the modulo of 300 is calculated for the extension.

base=(1.449551463224633×$10^{16}$)/300= 48,318,382,107,487 extension=(1.449551463224633×$10^{16}$)%300=234.

If the base part is expressed by the hexadecimal notation, 0x2BF2 0000 6B5F. If a part exceeding 33 bits is discarded (wrapped), 0x0 0000 6B5F (27,487 in decimal notation) is obtained. This is (Result 1).

Note that a general expression of a floating fraction is 52 bits for a mantissa part, 11 bits for an exponent part, and 1 bit for a sign, and thus a round-off error occurs in treating an integer of 64-bit precision at a time of performing a floating-point arithmetic operation.

Next, a case is described in which the dynamic range is further reduced before finding the number of cycles at 27 MHz.

If the above-described (1) is expressed by nanoseconds, 536,870,912,305,419,896 nanoseconds are obtained. If 95443.7176888888 . . . seconds are multiplied by 9, then 858,993.4592 seconds, i.e. 858,993,459,200,000 nanoseconds, are obtained. When nanosecond is considered as the unit, the lower five digits of the divisor of the modulo operation are 0. Accordingly, the modulo operation is performed by using 100,000 nanoseconds as the unit, and the dynamic range is further reduced. Thereby, since the range of 0~95443.7176888888 is obtained, the precision becomes 47 (=17+30) bits.

536,870,912,305,4%858,993,459,2 (commas for division of digits are intentionally placed at positions of the nanosecond notation)

$$= 5,368,709,123,054 \% 8,589,934,592$$
$$= 3,054$$
$$= 305, 4 \text{ (100,000 nanoseconds)}.$$

If the above-described modulo and the lower five digits, which were ignored at the time of calculating the modulo, are combined, 305,419,896 nanoseconds are obtained. The upper six digits are 305,419 microseconds. Since the STC counter value is counted at 27 MHz (27 cycles are counted per 1 microsecond), the count value becomes 8,246,313 cycles.

On the other hand, since the lower three digits are 0.896 microseconds, 0.896×27=24.192 cycles. By round-off, 24 cycles are obtained. By adding this to the above, 8,246,337 cycles@27 MHz are obtained.

In order to separate a 90 kHz part (base) and 27 MHz part (extension) of the STC counter value, a value (integer) obtained by division by 300 is calculated for the base, and the modulo of 300 is calculated for the extension.

$$\text{base}=8,246,337/300=27,487$$

$$\text{extension}=8,246,337 \; 300=237.$$

Here, if the base is a value exceeding $2^{33}$, the lower 33 bits expressed by binary numbers are set as the base, and the wrap process is not necessary in the above arithmetic operation result. This is (Result 2).

If (Result 1) and (Result 2) are compared, there is an error of 3 clocks in the 27 MHz precision, as described below.

(Result 1) 27,487 (base), 234 (extension)
(Result 2) 27,487 (base), 237 (extension).

Since the decoding/presentation timing (DTS•PTS) of video/audio may be controlled with the precision of 90 kHz, it can be thought, from the above results, that no problem arises no matter which of the method of (Result 1) and the method of (Result 2) is used.

However, the precision of 27 MHz is expected for the system clock (STC (PCR)). Accordingly, when a certain system is constructed, it is desirable to make uniform the arithmetic operation method (precision) in all associated apparatuses. If consideration is given to the difficulty in making uniform the arithmetic operation precision between apparatuses, there is a case in which the method of (Result 2) is preferable to the method of (Result 1).

In particular, in the case of the method of (Result 1), it is necessary to make uniform not only the procedures, but also the floating-point arithmetic operation parts. If consideration is given to a system which is constructed in various venders and platforms, the method of (Result 1) should be avoided.

The TAI/STC converter 22*b* outputs the PCR value, which is calculated as described above, to the PCR packet generator 22*f*1, outputs the PTS value and DTS value to the video packet generator 22*f*2, outputs the PTS value to the audio packet generator 22*f*3, and outputs the PTS value to the subtitle packet generator 24*f*4.

On the other hand, the separator 22*d* separates video data, audio data and subtitle data 22*e*3, for example, from video/audio such as MoIP packets, which are included in the input IP packets. The separator 22*d* outputs the video data to the video encoder 22*e*1, outputs the audio data to the audio encoder 22*e*2, and outputs the subtitle data 22*e*3 to the subtitle packet generator 22*f*4.

The video encoder 22*e*1 encodes the video data, and outputs the encoded video data to the video packet generator 22*f*2.

The audio encoder 22*e*2 encodes the audio data, and outputs the encoded audio data to the audio packet generator 22*f*3.

The PCR packet generator 22*f*1 generates a PCR packet in accordance with the control by the
TS packet generation timing controller 22*c*, adds the PCR value, which is output from the TAI/STC converter 22*b*, to the generated PCR packet, and outputs the PCR packet to the selector 22*f*5.

The video packet generator 22*f*2 generates a video packet from the video data which is output from the video encoder 22*e*1, in accordance with the control by the TS packet generation timing controller 22*c*, adds the PTS value and, when necessary, the DTS value, which are output from the TAI/STC converter 22*b*, to the generated video packet, and outputs the video packet to the selector 22*f*5.

The audio packet generator 22*f*3 generates an audio packet from the audio data which is output from the audio encoder 22*e*2, in accordance with the control by the TS packet generation timing controller 22*c*, adds the PTS value, which is output from the TAI/STC converter 22*b*, to the generated audio packet, and outputs the audio packet to the selector 22*f*5.

The subtitle packet generator 22*f*4 generates a subtitle packet from the subtitle data 22*e*3 which is output from the separator 22*d*, in accordance with the control by the TS packet generation timing controller 22*c*, adds the PTS value, which is output from the TAI/STC converter 22*b*, to the generated subtitle packet, and outputs the subtitle packet to the selector 22*f*5.

The selector 22*f*5 selects one of the PCR packet output from the PCR packet generator 22*f*1, the video packet output from the video packet generator 22*f*2, the audio packet output from the audio packet generator 22*f*3 and the subtitle packet output from the subtitle packet generator 22*f*4, and outputs the selected packet as the TS packet.

(Multiplexing Apparatus)

Figure 4:
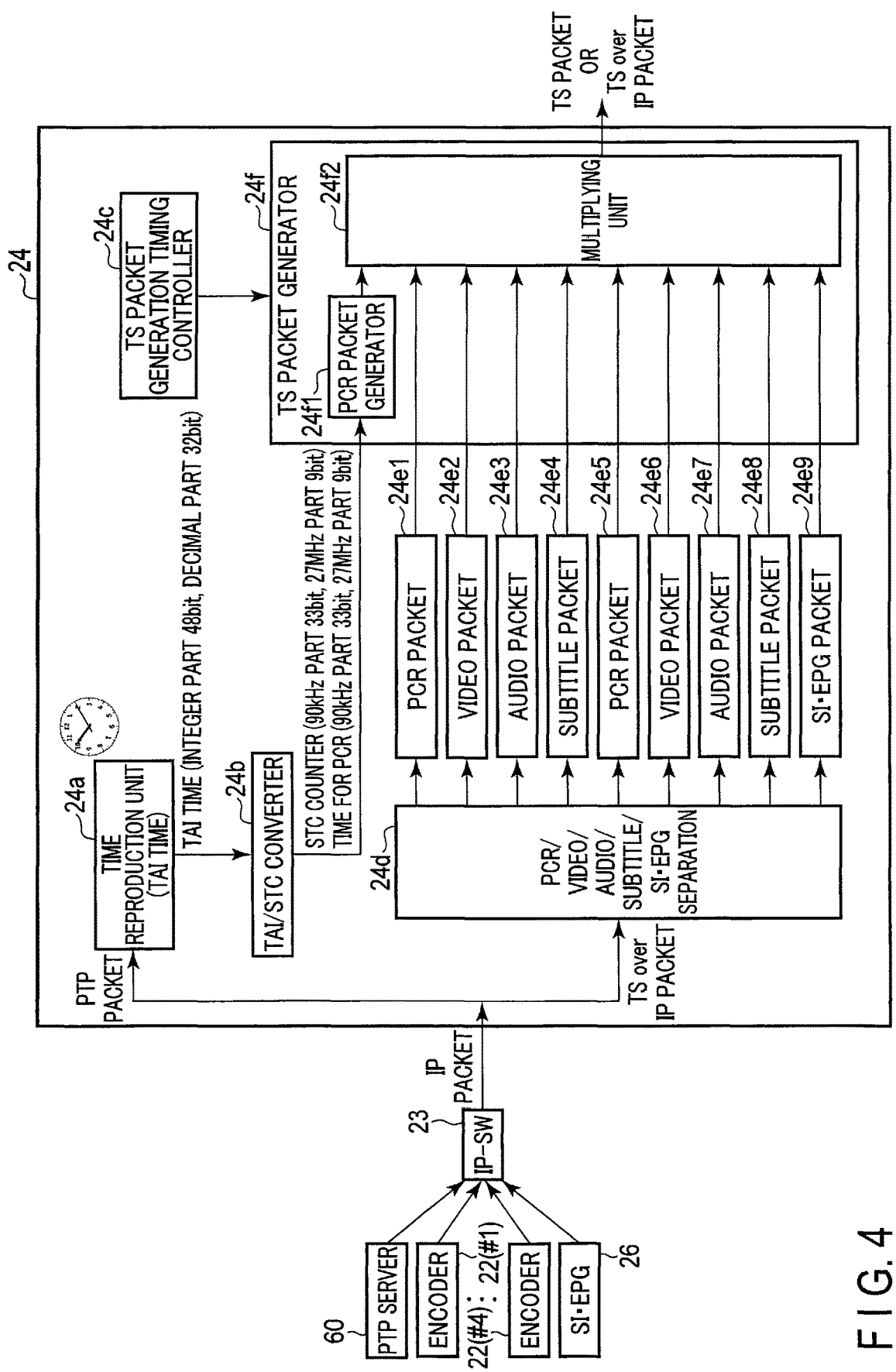
FIG. 4 is a conceptual view illustrating a configuration example of a multiplexing apparatus to which the synchronization control method and synchronization control apparatus of the first embodiment are applied.

FIG. 4 is a conceptual view illustrating a configuration example of the multiplexing apparatus 24 to which the synchronization control method and synchronization control apparatus of the first embodiment are applied.

The multiplexing apparatus 24 includes a processor (not shown) and a program memory (not shown). The multiplexing apparatus 24 includes, as necessary control functions for implementing the present embodiment, a time reproduction unit 24*a*, a TAI/STC converter 24*b*, a PCR packet generation timing controller 24*c*, a PCR/video/audio/subtitle/SI•EPG separator 24*d* (hereinafter, simply referred to as "separator 24*d*"), and a TS packet generator 24*f*. These control functions are realized by causing the CPU to execute programs stored in the program memory.

The TS packet generator 24*f* further includes a PCR packet generator 24*f*1 and a multiplexing unit 24*f*2.

IP packets from the PTP server 60 and encoders 22 are input to the multiplexing apparatus 24 via an IP-SW 23 which is not shown in FIG. 1 or FIG. 2. Note that the IP packets are not limited to the IP packets which are output from the PTP server 60 and encoders 22, and may include IP packets output from an SI•EPG 26 which is not shown in FIG. 1 or FIG. 2.

The time reproduction unit 24a has the same configuration as the time reproduction unit 22a. The time reproduction unit 24a receives the PTP packet included in the input IP packet, samples TAI time at the time of receiving the PTP packet, and outputs the sampled TAI time to the TAI/STC converter 24b.

The TAI/STC converter 24b has the same configuration as the TAI/STC converter 22b. The TAI/STC converter 24b converts the TAI time, which is output from the time reproduction unit 24a, to the STC counter value (PCR value) which is used for synchronization control between the systems. The STC counter value is used for synchronization control between the systems.

Accordingly, the TAI/STC converter 24b operates as a synchronization control apparatus by which the synchronization control method of the present embodiment is implemented in the corresponding multiplexing apparatuses 24 of the working system 20A and auxiliary system 20B.

The calculation procedure of the PCR value in the TAI/STC converter 24b is the same as the calculation procedure in the TAI/STC converter 22b, so an overlapping description is avoided.

The TAI/STC converter 24b outputs the calculated PCR value to the PCR packet generator 24f1.

On the other hand, the separator 24d extracts, for example, from video/audio such as TS over IP packets, a PCR packet 24e1, a video packet 24e2, an audio packet 24e3, a subtitle packet 24e4, a PCR packet 24e5, a video packet 24e6, an audio packet 24e7, a subtitle packet 24e8, and an SI•EPG packet 24e9, and outputs the extracted packets to the multiplexing unit 24f2.

The PCR packet generator 22f1 generates a PCR packet in accordance with the control by the PCR packet generation timing controller 24c, adds the PCR value, which is output from the TAI/STC converter 24b, to the generated PCR packet, and outputs the PCR packet to the multiplexing unit 24f2.

The multiplexing unit 24f2 multiplexes the PCR packet which is output from the PCR packet generator 24f1, the PCR packet 24e1, video packet 24e2, audio packet 24e3, subtitle packet 24e4, PCR packet 24e5, video packet 24e6, audio packet 24e7, subtitle packet 24e8 and SI•EPG packet 24e9, and outputs the multiplexed packet.

As described above, in the compression multiplex system control apparatus 10 and compression multiplex system control apparatus 10', the time reproduction unit 22a, 24a and TAI/STC converter 22b, 24b are included in the encoder 22 and multiplexing apparatus 24. Thereby, while the apparatuses can be connected by only the Ethernet, the STC counter values can be synchronized.

In the Ethernet, since IP data flows can be classified, a plurality of transmission paths can theoretically be formed by one cable. Thus, the compression multiplex system control apparatus 10 is free from the use of a coaxial cable. Thereby, it is not necessary to distribute signals by a plurality of coaxial cables (SDI, DVB-ASI).

In addition, the synchronization of STC counter values is realized from the clock reproduced from the time information (PTP), in particular, in the encoder 22 and multiplexing apparatus 24 which are equipped with the time reproduction unit 22a, 24a and TAI/STC converter 22b, 24b. Thereby, the encoder 22 in the working system 20A and the corresponding encoder 22 in the auxiliary system 20B can be made to uniformly have identical STC counter values, and can be synchronized. Similarly, the multiplexing apparatus 24 in the working system 20A and the multiplexing apparatus 24 in the auxiliary system 20B can be made to uniformly have identical STC counter values, and can be synchronized. Thereby, seamless system switching between the working system 20A and auxiliary system 20B can be realized.

In this manner, according to the synchronization control method and synchronization control apparatus of the first embodiment, the time synchronization precision of the respective apparatuses can be improved by using the PTP (IP packet/Ethernet), and the STC counter values between the apparatuses can be synchronized based on the time information reproduced from the PTP. Therefore, seamless system switching can be realized by only the connection of the Ethernet cable.

Second Embodiment

A synchronization control method and synchronization control apparatus of a second embodiment of the invention will be described.

The second embodiment is a modification of the first embodiment. Here, the same structural parts as described in the first embodiment are denoted by the same reference numerals as used in the first embodiment, and an overlapping description is avoided. Different structural parts from the first embodiment will mainly be described.

Figure 5:
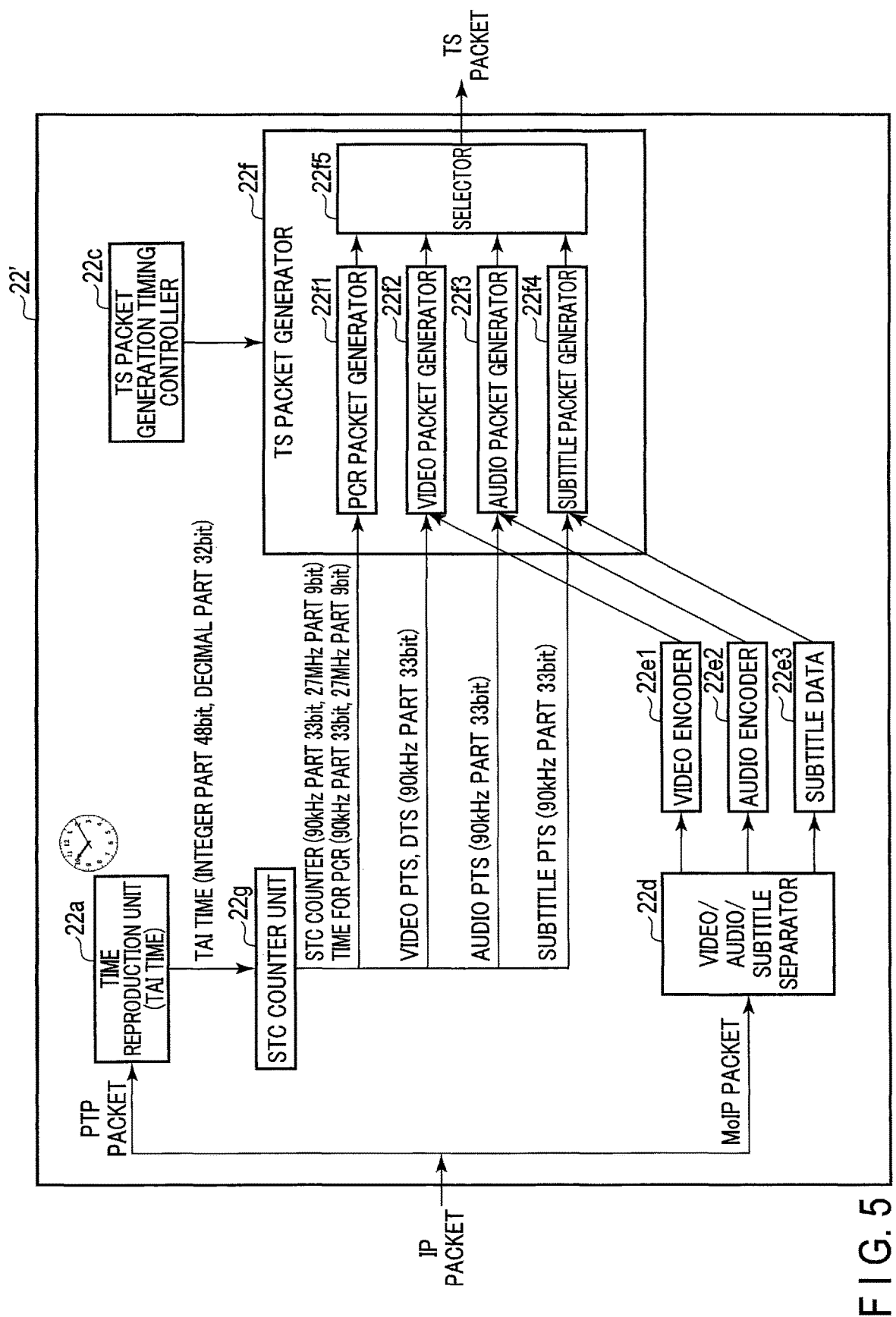
FIG. 5 is a conceptual view illustrating a configuration example of an encoder to which a synchronization control method and synchronization control apparatus of a second embodiment are applied.
Figure 6:
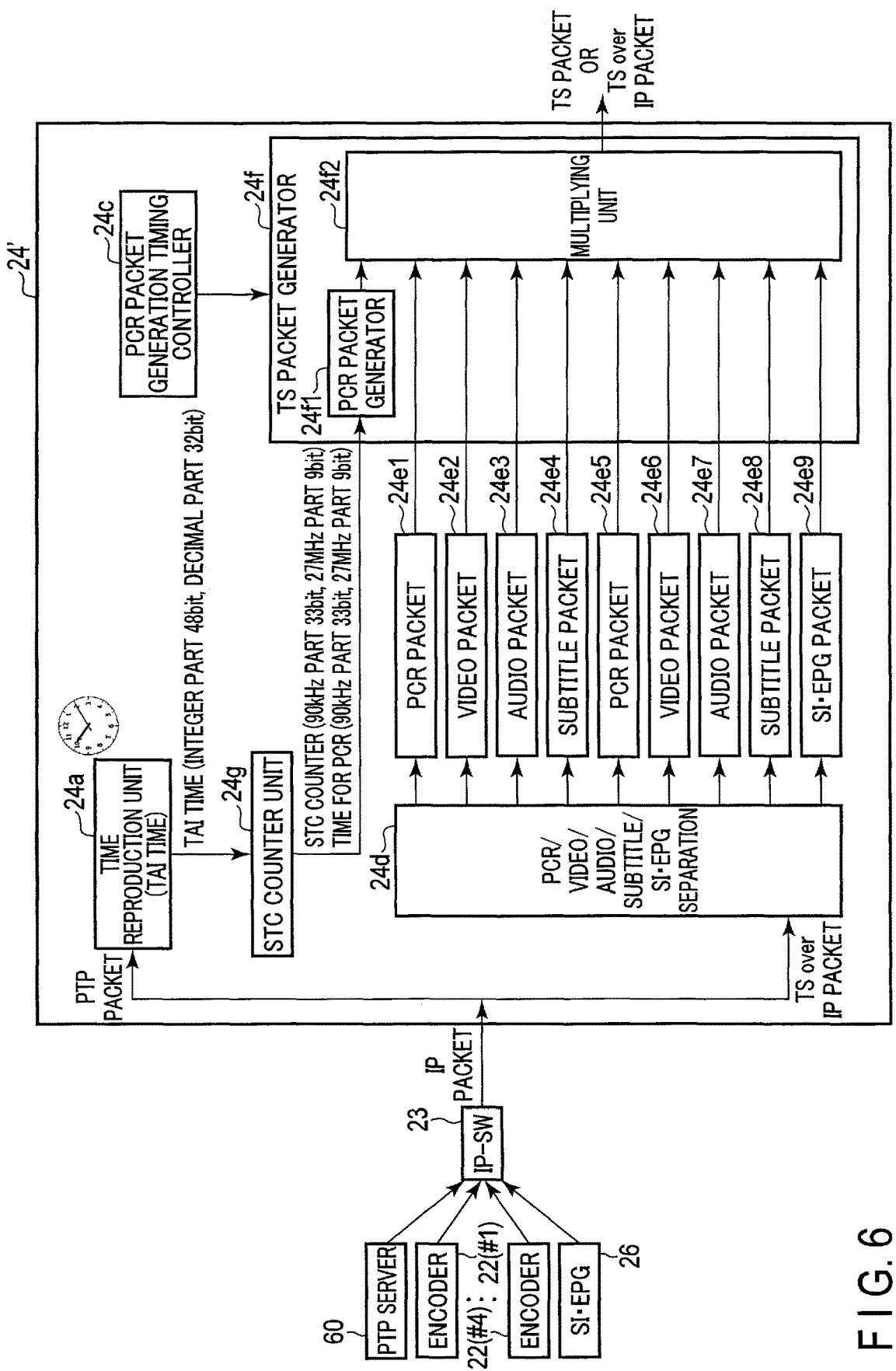
FIG. 6 is a conceptual view illustrating a configuration example of a multiplexing apparatus to which the synchronization control method and synchronization control apparatus of the second embodiment are applied.

FIG. 5 is a conceptual view illustrating a configuration example of an encoder to which the synchronization control method and synchronization control apparatus of the second embodiment are applied. FIG. 6 is a conceptual view illustrating a configuration example of a multiplexing apparatus to which the synchronization control method and synchronization control apparatus of the second embodiment are applied.

An encoder 22' shown in FIG. 5 is different from the encoder 22 shown in FIG. 3 in that a processor or dedicated arithmetic circuit (not shown) realizes an STC counter unit 22g in place of the TAI/STC converter 22b in the encoder 22 shown in FIG. 3.

In addition, a multiplexing apparatus 24' shown in FIG. 6 is different from the multiplexing apparatus 24 shown in FIG. 4 in that a processor or dedicated arithmetic circuit (not shown) realizes an STC counter unit 24g in place of the TAI/STC converter 24b in the multiplexing apparatus 24 shown in FIG. 4.

The STC counter unit 22g operates as a synchronization control apparatus by which the synchronization control method of the present embodiment is implemented in the corresponding encoders 22' of the working system 20A and auxiliary system 20B.

The STC counter unit 24g operates as a synchronization control apparatus by which the synchronization control method of the present embodiment is implemented in the corresponding multiplexing apparatuses 24' of the working system 20A and auxiliary system 20B.

Since the configuration of the STC counter unit 22g is identical to the configuration of the STC counter unit 24g, the configuration of the STC counter unit 22g will representatively be described below with reference to FIG. 7.

FIG. 7 is a functional block diagram illustrating detailed configuration examples of the STC counter unit 22g and time reproduction unit 22a provided in the front stage of the STC counter unit 22g, by which the synchronization control apparatus of the present embodiment is realized.

The time reproduction unit 22a includes a phase comparator 22a1, a loop filter 22a2, a VCO (Voltage-controlled oscillator) 22a3, and a TAI time counter 22a4.

The STC counter unit 22g includes a TAI/STC converter 22g1, a phase comparator 22g2, a loop filter 22g3, a VCO 22g4, a 27 MHz counter 22g5, and an STC counter 22g6.

The STC counter unit 22g executes initial reset of the 27 MHz counter 22g5 when the decimal part of the TAI time becomes zero.

The 27 MHz counter 22g5 counts up by the clock generated by the VCO 22g4 (the precision of 27 MHz±α), and returns to zero when 27 M cycles have passed.

When the integer second of the TAI time counts up in the TAI time counter 22a4 of the time reproduction unit 22a (or when the 27 MHz counter 22g5 of the STC counter unit 22g returns to 0), the phase comparator 22g2 compares the phases of both counters (e.g. in every second). When the 27 MHz counter 22g5 is fast, the oscillation frequency of the VCO 22g4 is lowered via the loop filter 22g3. When the 27 MHz counter 22g5 is slow, the oscillation frequency of the VCO 22g4 is increased via the loop filter 22g3. This is the same as the operation of a general PLL.

At a time point when the difference of the phase comparator 22g2 decreases to a specified value or less, it is regarded that the PLL is set in the locked state, and the TAI/STC converter 22g1 samples the TAI time, converts the sampled TAI time to an STC counter value, and loads the STC counter value as an initial value of the STC counter value. In this case, it is desirable to correct the initial value by giving consideration to a delay time necessary for conversion. Subsequently, the STC counter 22g6 operates at 27 MHz which is locked to the TAI time.

Thereafter, the STC counter 22g6 is made to operate independently, and the initial value of the STC counter value is found from the TAI and loaded in the STC counter 22g6. Although the STC counter 22g6 operates at 27 MHz, the TAI time counter 22a4 is locked by PLL to the clock for TAI count (1 GHz or a division of 1 GHz) generated from the PTP packet, in order to find the TAI time in the TAI time counter 22a4.

The STC counter 22g6 is not easy to handle, since the base of the 90 kHz operation is 33 bits and the extension of the 27 MHz operation is 9 bits (values are 0~299). Thus, for example, a counter which circles at 27M cycles is separately prepared, phase comparison is performed in every second (in every count-up of a second), and the VCO 22g4 (the precision of 27 MHz±α) is controlled and locked.

The STC counter 22g6 samples and uses STC counter values, when generating packets in which the PCR, PTS and DTS are contained.

In this manner, in place of the TAI/STC converter 22b, 24b in the first embodiment, the STC counter unit 22g, 24g is provided, the initial value of the STC counter value is set from the TAI time, and the STC counter is made to operate independently. With this configuration, like the first embodiment, the STC counter values can be uniquely determined based on the time information reproduced from the PTP. Therefore, the STC counter values between the apparatuses can be synchronized by only the connection of the Ethernet cable, and thus seamless system switching can be realized.

[Modifications]

As a modification, an encoder 22 and multiplexing apparatus 24, which are additionally equipped with a function of calculating, based on TAI time, an audio frame number, a video field number and a video frame number, will be described.

FIG. 8 is a block diagram illustrating configuration examples of the time reproduction unit 22a, and an audio frame number calculator 22h, a video field number calculator 22i and a video frame number calculator 22j which are connected to the time reproduction unit 22a.

The audio frame number calculator 22h, video field number calculator 22i and video frame number calculator 22j, which are illustrated in FIG. 8, are connected in parallel to the time reproduction unit 22a, and are provided in the encoder 22. Similarly, these may be connected to the time reproduction unit 24a and may thereby be provided in the multiplexing apparatus 24.

The audio frame number calculator 22h, video field number calculator 22i and video frame number calculator 22j include dividers 22h1, 22i1 and 22j1 and round-to-integer units 22h2, 22i2 and 22j2, respectively. The divider 22h1, 22i1, 22j1 divides, by each period, the TAI time which is output by the TAI time counter 22a4 of the time reproduction unit 22a. The round-to-integer units 22h2, 22i2 and 22j2 set integer parts of quotients, which are obtained by the corresponding dividers 22h1, 22i1 and 22j1, as an audio frame number, a video field number and video frame number, respectively. In this case, for example, the respective calculators may be configured by taking the arithmetic precision into account, such that as regards the audio frame number calculator 22h, in the case of 48 kHz, one audio frame period is set to be 1024/48000 seconds; as regards the video field number calculator 22i, in the case of a 59.94i signal, one video field period is set to be 1000/(30*1001) seconds; and as regards the video frame number calculator 22j, in the case of a 59.94i signal, one video frame period is set to be 1000/(30*1001) seconds.

In addition, as regards video, by controlling the timing of rounding-to-integer by a B.B. (Black Burst) signal generated based on SMPTE ST 2059, an error in implementation with low arithmetic precision can be suppressed. For example, if a Vsync (vertical synchronization signal) based on B.B. becomes active when a decimal part of a division result is 0.9~0.999 . . . , the value is rounded up at the time of rounding-to-integer. In addition, even if the division result becomes 1.0 or more, the value is not updated at the time of rounding-to-integer, until the Vsync becomes active.

In this manner, by properly providing the audio frame number calculator 22h, video field number calculator 22i and video frame number calculator 22j, the audio frame number, video field number and video frame number can also be calculated based on the TAI time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A synchronization control apparatus which synchronizes a system time clock (STC) counter value, based on TAI (Temps Atomique International: international atomic time) time, in each of systems which constitute a transmission system in a broadcasting system or a distribution system, comprising:
a processor or a dedicated arithmetic circuit configured to determine a time length in which the STC counter value laps, to calculate a remainder of the time length relative to the TAI time, and to convert the remainder to the STC counter value, thereby determining the STC counter value.

2. The synchronization control apparatus of claim 1, wherein when the processor or the dedicated arithmetic circuit calculates the remainder, the processor or the dedicated arithmetic circuit is further configured to calculate a remainder of an integer or a finite decimal, which is obtained by multiplying the time length by an integer.

3. The synchronization control apparatus of claim 2, wherein when the processor or the dedicated arithmetic circuit calculates the remainder of the integer or the finite decimal, when the processor or the dedicated arithmetic circuit calculates the remainder by the finite decimal, the processor or the dedicated arithmetic circuit is further configured to multiply the TAI time and the finite decimal by $10^n$ (n being a natural number), such that the finite decimal becomes an integer.

4. The synchronization control apparatus of claim 1, wherein the systems include a first system and a second system which are identically configured,
each of the first system and the second system includes an encoder and a multiplexing apparatus, and
the synchronization control apparatus is provided in the encoders in the first system and the second system, or in the multiplexing apparatuses in the first system and the second system, or in both the encoders and the multiplexing apparatuses in the first system and the second system.

5. A synchronization control method for synchronizing a system time clock (STC) counter value, based on TAI (Temps Atomique International: international atomic time) time, in each of systems which constitute a transmission system in a broadcasting system or a distribution system, comprising:
determining, in each of the systems, a time length in which the STC counter value laps;
calculating, in each of the systems, a remainder of the time length relative to the TAI time; and
converting, in each of the systems, the remainder to the STC counter value, thereby determining the STC counter value.

6. The synchronization control method of claim 5, wherein the STC counter value is a PCR (program clock reference) value composed of a base of a first frequency and an extension of a second frequency.

7. The synchronization control method of claim 5, wherein the calculating step includes calculating a remainder of an integer or a finite decimal, which is obtained by multiplying the time length by an integer.

8. The synchronization control method of claim 7, wherein the step of calculating the remainder of the integer or the finite decimal includes multiplying, when calculating the remainder by the finite decimal, the TAI time and the finite decimal by $10^n$ (n being a natural number), such that the finite decimal becomes an integer.

* * * * *